United States Patent [19]

Kawasaki

[11] E Patent Number: Re. 32,080

[45] Reissued Date of Patent: Feb. 11, 1986

[54] METHOD AND APPARATUS FOR TRANSMISSION OF INFORMATION IN A PHOTOGRAPHIC CAMERA

[75] Inventor: Masahiro Kawasaki, Tokyo, Japan

[73] Assignee: Asahi Kogaku Kogyo Kabushiki Kaisha, Japan

[21] Appl. No.: 640,865

[22] Filed: Aug. 15, 1984

Related U.S. Patent Documents

Reissue of:

[64] Patent No.: 4,360,255
Issued: Nov. 23, 1982
Appl. No.: 286,332
Filed: Jul. 23, 1981

[30] Foreign Application Priority Data

Jul. 31, 1980 [JP] Japan ..... 55-105527

[51] Int. Cl.[4] ..... G03B 7/20

[52] U.S. Cl. ..... 354/410; 354/455; 354/286

[58] Field of Search ..... 354/410, 442, 444, 455, 354/270, 271.1, 273, 286, 289.12

[56] References Cited

U.S. PATENT DOCUMENTS 3,928,858 12/1975 Sakurada et al. ..... 354/43 X
4,118,713 10/1978 Murakami et al. ..... 354/286 X
4,118,726 10/1978 Kuramoto et al. ..... 354/286 X
4,214,824 7/1980 Stemme et al. ..... 354/289 X
4,283,133 8/1981 Ishizaka et al. ..... 354/270
4,477,161 10/1984 Kawasaki et al. ..... 354/455 X

FOREIGN PATENT DOCUMENTS 134571 3/1979 Fed. Rep. of Germany ..... 354/286

*Primary Examiner*—William B. Perkey
*Attorney, Agent, or Firm*—Christie, Parker & Hale

[57] ABSTRACT

A photographic camera has a camera body, an interchangeable lens assembly mounted on the camera body, and an automatic exposure control mechanism located in the camera body. The mechanism responds to a first binary signal representative of a maximum lens aperture value in binary code and a second binary signal representative of a minimum lens aperture value in binary code. The first signal has a given number of binary bits. The second signal is generated in the lens assembly. A third signal representative of the arithmetic difference between the first and second signals is also generated in the lens assembly. The third signal has a number of binary bits fewer than the given number. The second and third signals generated in the lens assembly are transmitted to the camera body. In the camera body, the second signal is applied to the mechanism and the transmitted second and third signals are arithmetically added to derive the first signal, which is applied to the mechanism.

12 Claims, 3 Drawing Figures

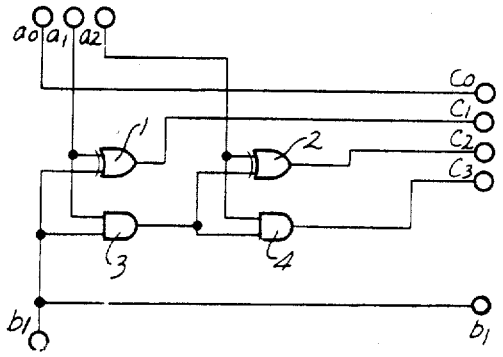
Fig 1
Fig 2
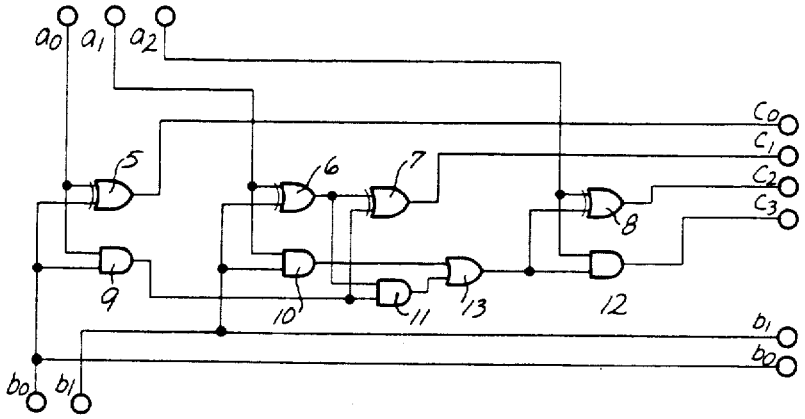

METHOD AND APPARATUS FOR TRANSMISSION OF INFORMATION IN A PHOTOGRAPHIC CAMERA

Matter enclosed in heavy brackets [ ] appears in the original patent but forms no part of this reissue specification; matter printed in italics indicates the additions made by reissue.

BACKGROUND OF THE INVENTION

The present invention provides a method to reduce the number of signal lines necessary for transmission of information on the maximum aperture and information on the minimum aperture of an objective to a camera body in a photographic camera of lens interchangeable type.

In a photographic camera provided with an automatic exposure control mechanism of shutter speed preset, i.e., priority, type, it is necessary to transmit information on the maximum aperture and information on the minimum aperture of the objective in use to the automatic exposure control mechanism. Assuming that a suitable type of film has been selected and a shutter speed has been set by the photographer, an appropriate exposure is sometimes impossible depending on the luminance of the object to be photographed, within an effective aperture range of the objective. In such a case, the photographer must be warned of this situation or photographing must be prevented, for example, by locking the shutter release. Especially when it is desired to provide a single-lens reflex camera usually used with a group of various interchangeable lenses with an automatic exposure control mechanism of shutter speed preset type, transmission of information on the maximum aperture and information on the minimum aperture is essential. With an automatic exposure control mechanism of diaphragm present, i.e., priority, type, on the other hand, it is necessary for a diaphragm value preset by the photographer to be transmitted to the automatic exposure control mechanism; transmission of the diaphragm value information is preferably done electrically in view of a fact that the essential part of the automatic exposure control mechanism comprises an electronic circuit and the camera itself is extremely small. Thus, a plurality of signal lines are required for transmission of information on the objective diaphragm to the camera body and, preferably, the number of these signal lines is as small as possible.

SUMMARY OF THE INVENTION

Accordingly, the present invention reduces the number of signal lines by deriving an electrical signal resulting from an arithmetic operation on an electrical signal representative of the maximum aperture and an electrical signal representative of the minimum aperture of the objective, and using the derived signal as the information on the maximum aperture to be transmitted from the objective to the camera body. Specifically, a photographic camera has a camera body, an interchangeable lens assembly mounted on the camera body, and an automatic exposure control mechanism located in the camera body. The mechanism responds to a first binary signal representative of a maximum lens aperture value in binary code and a second binary signal representative of a minimum lens aperture value in binary code. The first signal has a given number of binary bits. The second signal is generated in the lens assembly. A third signal representative of the arithmetic difference between the first and second signals is also generated in the lens assembly. The third signal has a number of binary bits fewer than the given number. The second and third signals generated in the lens assembly are transmitted to the camera body. In the camera body, the second signal is applied to the mechanism and the transmitted second and third signals are arithmetically added to derive the first signal, which is applied to the mechanism.

BRIEF DESCRIPTION OF THE DRAWINGS

The features of a specific embodiment of the best mode contemplated of carrying out the invention are illustrated in the drawings, in which:

FIG. 1 is a logic circuit diagram illustrating an embodiment of a logic circuit for deriving a maximum aperture signal in a camera body for the case in which the minimum aperture signal is represented by a single bit;

FIG. 2 is a logic circuit diagram illustrating an embodiment of a logic circuit for deriving a maximum aperture signal in a camera body for the case in which the minimum aperture signal is represented by two bits.

DETAILED DESCRIPTION OF THE SPECIFIC EMBODIMENTS

Figure 3:
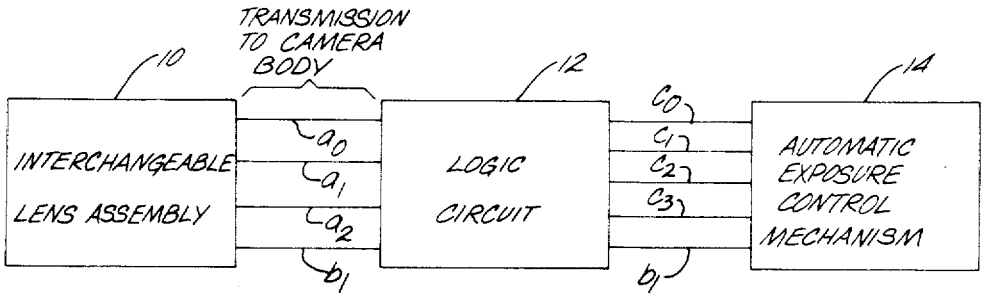
FIG. 3 is a block diagram of the components of a photographic camera relating to the invention.

In the transmission of information on the maximum aperture of an individual objective from the objective to the camera body, it is required to transmit at least ten items of diaphragm value information, i.e., 1.2, 1.4, 1.7, 2, 2.5, 2.8, 3.5, 4, 4.5, and 5.6 respectively in F-value for the commercially available group of interchangeable lens having different fully opened aperture values. Digital transmission of these information values on the maximum apertures from the objective to the camera body requires four signal lines shown by Table 1, in which $C_3$, $C_2$, $C_1$ and $C_0$ designate the binary code of a signal representative of actual maximum aperture corresponding to the respective maximum apertures in F-values. (This signal is referred to hereinafter as the actual maximum aperture signal.) As for the information related to the minimum aperture, on the other hand, the minimum aperture in F-value which is the largest one of the minimum aperture values of commonly used interchangeable lenses is used as the reference minimum aperture and the minimum aperture in F-value of the actually used objective relative to said reference minimum aperture in F-value is transmitted to the camera body. The electric signal representative of the difference of this reference minimum aperture and the minimum aperture of the actually used objective is hereby defined as the minimum aperture difference signal. Table 2 shows such minimum aperture difference signal in the case where one reference minimum aperture in F-value is 22 and the only other minimum aperture which can be selected is 32 in F-value.

It will be understood from the foregoing explanation that five signal lines are normally necessary for transmission of information on the maximum aperture and information on the minimum aperture. Now the features of the present invention will be described in reference with the cases of Tables 1 and 2.

Based on two findings that, in Table 1, three signal lines are sufficient for eight maximum apertures and the maximum aperture in F-value corresponding to the minimum aperture in F-value higher than a pre-determined value takes a relatively high value, the present invention employs as the signal to be transmitted from the objective to the camera body the maximum aperture signal expressed by $$\text{maximum aperture signal} = \text{actual maximum aperture signal} - \text{minimum aperture difference signal} \quad (1)$$

and reproduces this maximum aperture signal as $$\text{actual maximum aperture signal} = \text{maximum aperture signal} + \text{minimum aperture difference signal} \quad (2)$$

The minimum aperture difference signal $b_1$ is such that $b_1=0$ when the minimum aperture in F-value is 22 and $b_1=1$ when the minimum aperture in F-value is 32. Thus, $b_0$ is always equal to zero in arithmetic operation of formulae (1) and (2). According to the invention, the maximum aperture signal expressed by formula (1) is applied from the objective to the camera body, the arithmetic operation of formula (2) occurs in the camera body to reproduce the actual maximum aperture signal $C_3$, $C_2$, $C_1$ and $C_0$. The arithmetic operation for $b_1=0$ is shown by Table 3 and the arithmetic operation for $b_1=1$ is shown by Table 4. For example, the objective with the maximum aperture 2.8 in F-value and the minimum aperture 32 in F-value (corresponding to the case of $b_1=1$ as seen in Table 2) outputs the maximum aperture signal 011. In the camera body, a binary arithmetic adding operation 011 $(a_2a_1a_0)+010$ $(b_2b_1b_0)$ occurs and therefrom the actual maximum aperture signal 101 is reproduced. As will be understood from Table 1, this objective has its maximum aperture 2.8 in F-value. Then, the objective with the maximum aperture 2.8 in F-value and the minimum aperture 22 in F-value (corresponding to the case of $b_1=0$ as seen in Table 2) outputs the maximum aperture signal 101. In the camera body, a binary arithmetic adding operation 101 $(a_2a_1a_0)+000$ $(b_2b_1b_0)$ takes place and therefrom the actual maximum aperture signal 101 is reproduced. Table 1 indicates that this objective has its maximum aperture 2.8 in F-value. It will be evident from the foregoing description of the examples shown in connection with Tables 1 and 2 that three signal lines suffice for transmission of information representative of the maximum aperture according to the present invention. When the signal line for transmission of information representative of the minimum aperture is included, the necessary number of signal lines can be reduced by one according to the present invention to four; the information representative of the minimum aperture is used in the camera body to derive from the transmitted maximum aperture representative signal a usable signal for automatic exposure control.

Although the present invention has been described hereinabove with the minimum aperture being represented by a single bit, it is also possible to represent the minimum aperture by two bits-for example, $00(b_1b_0)$ for 22 in F-value, $01(b_1b_0)$ for 32 in F-value and $11(b_1b_0)$ for 45 in F-value—so that the number of the minimum apertures which can be selected may be increased to four while the number of signal lines for transmission of information related to the actual maximum aperture remains three. However, such two bit representation results in the same effect as achieved by the single bit representation of the minimum aperture, in that the total number of signal lines necessary for transmission can be reduced by one.

FIG. 3 is a block diagram of the applicable components of a camera; the system has interchangeable lens assemblies with two different minimum aperture values, e.g., a F-value of 22 and an F-value of 32. Four bits of binary information, namely, $a_0$, $a_1$, $a_2$, and $b_1$ are transmitted from an interchangeable lens assembly 10 to a logic circuit 12, which is located in the camera body on which the interchangeable lens assembly mounts. By way of example, bits $a_0$, $a_1$, $a_2$, and $b_1$ could be transmitted from lens assembly 10 to logic circuit 12 by means of contact pairs at the lens mount constructed in the manner shown in the application Ser. No. 237,987 filed Feb. 25, 1981, the disclosure of which is incorporated fully herein by reference. Bits $a_0$, $a_1$, $a_2$, and $b_1$ represent the maximum aperture signal in the code set forth in Tables 3 and 4. Bits $C_0$, $C_1$, $C_2$, $C_3$ and $b_1$ are transmitted from logic circuit 12 to an automatic exposure control mechanism 14, which in this embodiment automatically stops down the diaphragm to achieve the desired exposure. Mechanism 14 itself is convention in the art. By way of example, it could comprise the arrangement described in application Ser. No. 229,879 filed Jan. 30, 1981, the disclosure of which is incorporated fully herein by reference. As illustrated, logic circuit 12 derives five bits of information at its output from four bits of information at its input, thereby permitting a reduction in the number of bits of information that need to be transmitted from lens assembly 10 to the camera body.

FIG. 1 is a diagram of an embodiment of logic ciruit 12 to execute the arithmetic operation of the formula (2) when the minimum aperture difference signal is represented by a single bit. Reference numerals 1 and 2 designate exclusive OR gates and reference numerals 3 and 4 designate AND gates. FIG. 2 is a diagram of an embodiment of a logic circuit to execute the arithmetic operation of the formula (2) when the minimum aperture difference signal is represented by two bits. Reference numerals 5 to 8 designate exclusive OR gates, reference numerals 9 to 12 designate AND gates and reference numeral 13 designates an OR gate. It should be understood that the logic circuits as illustrated by FIGS. 1 and 2 are not limiting and these logical functions may be implemented in different ways.

The arithmetic operation to be executed by the logic circuit of FIG. 1 is given by the following logical expression:

$$C_0=a_0$$

$$C_1=a_1\oplus b_1$$

$$C_2=a_2\oplus a_1\cdot b_1$$

$$C_3=a_2\cdot a_1\cdot b_1$$

where $\oplus$ and $\cdot$ designate exclusive OR and AND, respectively.

It will be understood from the foregoing description that the present invention permits the number of signal lines for transmission of information related to the maximum aperture to be reduced by utilizing information related to the minimum aperture to be transmitted from the objective to the camera body. Specifically, a modified code value for the maximum aperture signal is used in the lens assembly, namely, the coded maximum aperture signal minus the coded minimum aperture signal in the code processed by the automatic exposure control mechanism. This subtraction permits a reduction of the number of information bits representative of the maximum aperture value transmitted to the camera body without creating a negative difference value, because only a zero value of the coded minimum aperture signal is subtracted from the lower values of the coded maximum aperture signal. In the camera body, the coded minimum aperture signal is added to the modified code value to reconstruct the coded maximum aperture signal to which the automatic exposure control mechanism responds. Although the present invention has been described with respect to the transmission of digital mode, the similar transmission may be achieved in analog mode.

*With reference to the following tables, each one of a plurality of interchangeable lens assemblies adapted for mounting on a camera body has a minimum aperture value and a maximum aperture value. There are a total of no more than $2^n$ different maximum aperture values, where $n=4$. As shown in table 1, there are, in this embodiment of the invention, actually ten different maximum aperture values. There are also among the lens assemblies no more than $2^m$ different minimum aperture values, where $m=2$. As shown in table 2, there are in this embodiment actually two different minimum aperture values. As further shown in table 1, the maximum aperture values are assigned, in increasing order, n-bit binary numbers, i.e., four-bit binary numbers, according to natural binary code, i.e., $C_0$, $C_1$, $C_2$, $C_3$. As further shown in table 2, the minimum aperture values are assigned, in increasing order, m-bit binary numbers, i.e., two-bit binary numbers, according to natural binary code, i.e., $b_1$, $b_0$. As illustrated by tables 3 and 4 and equation (1) there is generated an $n-1$ bit maximum aperture binary signal representative of a binary number, i.e., $a_2$, $a_1$, $a_0$, equal to the binary number assigned to the maximum aperture value minus the binary number assigned to the minimum aperture value of such lens assembly.*

TABLE 1

| Relationship between maximum aperture in F-value and actual maximum aperture signal | | | | |
|---|---|---|---|---|
| Maximum aperture in F-value | Actual maximum aperture signal | | | |
| | $C_3$ | $C_2$ | $C_1$ | $C_0$ |
| 1.2 | 0 | 0 | 0 | 0 |
| 1.4 | 0 | 0 | 0 | 1 |
| 1.7 | 0 | 0 | 1 | 0 |
| 2 | 0 | 0 | 1 | 1 |
| 2.5 | 0 | 1 | 0 | 0 |
| 2.8 | 0 | 1 | 0 | 1 |
| 3.5 | 0 | 1 | 1 | 0 |
| 4 | 0 | 1 | 1 | 1 |
| 4.5 | 1 | 0 | 0 | 0 |
| 5.6 | 1 | 0 | 0 | 1 |

TABLE 2

| Relationship between minimum aperture in F-value and minimum aperture difference signal | |
|---|---|
| Minimum aperture in F-value | Minimum aperture difference signal $b_1$ |
| 22 | 0 |
| 32 | 1 |

TABLE 3

| Case of $b_1 = 0$ (minimum aperture 22 in F-value) | | | | | | | |
|---|---|---|---|---|---|---|---|
| Maximum aperture signal | | | Actual maximum aperture signal | | | | Maximum aperture in F-value |
| $a_2$ | $a_1$ | $a_0$ | $C_3$ | $C_2$ | $C_1$ | $C_0$ | |
| 0 | 0 | 0 | 0 | 0 | 0 | 0 | 1.2 |
| 0 | 0 | 1 | 0 | 0 | 0 | 1 | 1.4 |
| 0 | 1 | 0 | 0 | 0 | 1 | 0 | 1.7 |
| 0 | 1 | 1 | 0 | 0 | 1 | 1 | 2 |
| 1 | 0 | 0 | 0 | 1 | 0 | 0 | 2.5 |
| 1 | 0 | 1 | 0 | 1 | 0 | 1 | 2.8 |
| 1 | 1 | 0 | 0 | 1 | 1 | 0 | 3.5 |
| 1 | 1 | 1 | 0 | 1 | 1 | 1 | 4 |

TABLE 4

| Case of $b_1 = 1$ (minimum aperture 32 in F-value) | | | | | | | |
|---|---|---|---|---|---|---|---|
| Maximum aperture signal | | | Actual maximum aperture signal | | | | Maximum aperture in F-value |
| $a_2$ | $a_1$ | $a_0$ | $C_3$ | $C_2$ | $C_1$ | $C_0$ | |
| 0 | 0 | 0 | 0 | 0 | 1 | 0 | 1.7 |
| 0 | 0 | 1 | 0 | 0 | 1 | 1 | 2 |
| 0 | 1 | 0 | 0 | 1 | 0 | 0 | 2.5 |
| 0 | 1 | 1 | 0 | 1 | 0 | 1 | 2.8 |
| 1 | 0 | 0 | 0 | 1 | 1 | 0 | 3.5 |
| 1 | 0 | 1 | 0 | 1 | 1 | 1 | 4 |
| 1 | 1 | 0 | 1 | 0 | 0 | 0 | 4.5 |
| 1 | 1 | 1 | 1 | 0 | 0 | 1 | 5.6 |

What is claimed is:

1. In a photographic camera having a camera body, an interchangeable lens assembly mounted on the camera body, and an automatic exposure control mechanism located in the camera body, the mechanism responding to a first binary signal representative of a maximum lens aperture value in binary code and a second binary signal representative of a minimum lens aperture value in binary code, the first signal having a given number of binary bits, a method comprising the steps of:

generating in the lens assembly a second signal representative of the minimum aperture value for the lens assembly;

generating in the lens assembly a third signal representative of the arithmetic difference between the first and second signals for the lens assembly, the third signal having a number of binary bits fewer than the given number;

transmitting the second and third signals generated in the lens assembly to the camera body;

applying the second signal to the mechanism;

arithmetically adding the transmitted second and third signals to derive the first signal for the lens assembly; and applying the derived first signal to the mechanism.

2. In a photographic camera having an interchangeable lens mounted on the camera body, the combination comprising:

a source of a first signal in binary code located in the lens assembly, the first signal having a given number of binary information bits;

a source of a second signal in binary code located in the lens assembly;

means for transmitting the first and second signals from the source in the lens assembly to the camera body;

means for arithmetically adding the first and second signals in the camera body to derive a third signal in binary code having a number of binary information bits one more than the given number; and means partially responsive to the third signal for automatically controlling light exposure.

3. The combination of claim 2, in which the controlling means is responsive to the transmitted second signal and the derived third signal.

*4. An interchangeable lens for a photographic camera using lenses interchangeably, the lens having means for transmitting information representative of a maximum lens aperture value from the lens to the camera body and means for transmitting and information representative of a minimum lens aperture value from the lens to the camera body, wherein a signal representative of the maximum lens aperture value is generated as the signal representative of a difference between a signal representative of the actual maximum lens aperture and a signal representative of the actual minimum lens aperture of the lens.*

*5. In an interchangeable lens having a minimum aperture in F-value of 22 or 32, a maxinum aperture in F-value of 1.2, 1.4, 1.7, 2, 2.5, 2.8, 3.5, or 4 if the minimum aperture in F-value is 22, and a maximum aperture in F-value of 1.7, 2, 2.5, 2.8, 3.5, 4, 4.5, or 5.6 if the minimum aperture in F-value is 32, means for generating at least one bit of binary information representative of the minimum aperture of the lens and means for generating a three-bit maximum aperture signal, $a_2$, $a_1$, $a_0$, of binary information representative of the maximum aperture of the lens, the correspondence between the maximum aperture signal and the maximum aperture in F-value being in accordance with the following table when the minimum F-value is 22*

| Maximum aperture signal | | | Actual maximum signal | | | | Maximum aperture |
|---|---|---|---|---|---|---|---|
| $a_2$ | $a_1$ | $a_0$ | $C_3$ | $C_2$ | $C_1$ | $C_0$ | in F-value |
| 0 | 0 | 0 | 0 | 0 | 0 | 0 | 1.2 |
| 0 | 0 | 1 | 0 | 0 | 0 | 1 | 1.4 |
| 0 | 1 | 0 | 0 | 0 | 1 | 0 | 1.7 |
| 0 | 1 | 1 | 0 | 0 | 1 | 1 | 2 |
| 1 | 0 | 0 | 0 | 1 | 0 | 0 | 2.5 |
| 1 | 0 | 1 | 0 | 1 | 0 | 1 | 2.8 |
| 1 | 1 | 0 | 0 | 1 | 1 | 0 | 3.5 |
| 1 | 1 | 1 | 0 | 1 | 1 | 1 | 4 |

*and the correspondence between the maximum aperture signal and the maximum aperture in F-value being in accordance with the following table when the minimum F-value is 32*

| Maximum aperture signal | | | Actual maximum signal | | | | Maximum aperture |
|---|---|---|---|---|---|---|---|
| $a_2$ | $a_1$ | $a_0$ | $C_3$ | $C_2$ | $C_1$ | $C_0$ | in F-value |
| 0 | 0 | 0 | 0 | 0 | 1 | 0 | 1.7 |
| 0 | 0 | 1 | 0 | 0 | 1 | 1 | 2 |
| 0 | 1 | 0 | 0 | 1 | 0 | 0 | 2.5 |
| 0 | 1 | 1 | 0 | 1 | 0 | 1 | 2.8 |
| 1 | 0 | 0 | 0 | 1 | 1 | 0 | 3.5 |
| 1 | 0 | 1 | 0 | 1 | 1 | 1 | 4 |
| 1 | 1 | 0 | 1 | 0 | 0 | 0 | 4.5 |

-continued

| Maximum aperture signal | | | Actual maximum signal | | | | Maximum aperture |
|---|---|---|---|---|---|---|---|
| $a_2$ | $a_1$ | $a_0$ | $C_3$ | $C_2$ | $C_1$ | $C_0$ | in F-value |
| 1 | 1 | 1 | 1 | 0 | 0 | 1 | 5.6 |

*6. In an interchangeable lens having one of a plurality of minimum F-values no more than $2^m$, a plurality of maximum F-values no more than $2^n$, where the choice of maximum F-values is partially different for each minimum F-value, the improvement comprising first means for generating an m bit binary signal representative of a minimum F-value and second means for generating an $n-1$ bit binary signal representative of a maximum F-value.*

*7. The interchangeable lens of claim 6, in which $m=1$, $n=4$, the first generating means generates one bit and the second generating means generates three bits.*

*8. The interchangeable lens of claim 6, in which $m=2$ and $n=4$, the first generating means generates two bits and the second generating means generates three bits.*

*9. A family of interchangeable lens assemblies adapted for mounting on a camera body, the lens assemblies having a minimum aperture value and a maximum aperture value, there being among the lens assemblies a total of no more than $2^n$ different maximum aperture values and a total of no more than $2^m$ different minimum aperture values, the maximum aperture values being assigned in increasing order n bit binary numbers according to natural binary code, the minimum aperture values being assigned in increasing order m bit binary numbers according to natural binary code, each lens assembly comprising means for generating an m bit minimum aperture binary signal representative of the binary number assigned to the minimum aperture value of such lens and means for generating an $n-1$ bit maximum aperture binary signal representative of the binary number assigned to the maximum aperture value of such lens assembly minus the binary number assigned to the minimum aperture value of such lens assembly.*

*10. The family of lens assemblies of claim 9, in which $n=4$ and $m=1$.*

*11. The family of lens assemblies of claim 9, in which $n=4$ and $m=2$.*

*12. A lens assembly, which is one of a family of interchangeable lens assemblies adapted for mounting on a camera body, the lens assemblies each having a minimum aperture value and a maximum aperture value, there being among the lens assemblies a total of no more than $2^n$ different maximum aperture values and a total of no more than $2^m$ different minimum aperture values, the maximum aperture values being assigned in increasing order n-bit binary numbers according to natural binary code, the minimum aperture values being assigned in increasing order m-bit binary numbers according to natural binary code, the lens assembly comprising means for generating an m bit minimum aperture binary signal representative of the binary number assigned to the minimum aperture value of such lens assembly and means for generating an $n-1$ bit maximum aperture binary signal representative of a binary number equal to the binary number assigned to the maximum aperture value of such lens assembly minus the binary number assigned to the minimum aperture value of such lens assembly.*

* * * * *